Dec. 21, 1965  O. G. FOULGER  3,225,277
STEPPER MOTOR CONTROL CIRCUIT
Filed July 22, 1963  2 Sheets-Sheet 1

INVENTOR.
ORSON G. FOULGER
BY
*P. H. Finkt*
ATTORNEY.

Dec. 21, 1965

O. G. FOULGER 3,225,277

STEPPER MOTOR CONTROL CIRCUIT

Filed July 22, 1963

INVENTOR.
ORSON G. FOULGER
BY
*O. H. Firsht*
ATTORNEY.

ated Dec. 21, 1965

3,225,277
STEPPER MOTOR CONTROL CIRCUIT
Orson G. Foulger, Goleta, Calif., assignor to the United States of America as represented by the Secretary of the Navy
Filed July 22, 1963, Ser. No. 296,871
3 Claims. (Cl. 318—138)
(Granted under Title 35, U.S. Code (1952), sec. 266)

The invention herein described may be manufactured and used by or for the Government of the United States of America for governmental purposes without the payment of any royalties thereon or therefor.

The present invention relates to a control system and more particularly to system for controlling direction and sequential step rotation of a reversible rotor shaft in accordance with a series of electronic pulse input signals.

In the field of digital control system, direct current electrical motors, commonly referred to as stepper motors, are used to convert pulsed electronic signals to incremental angular rotation. These motors include stator windings, or inductance coils, which are sequentially energized to cause the rotor to advance in discrete steps. Heretofore, complicated and complex control circuits or systems have been utilized to impart unidirectional sequential rotation to stepper motors. These circuits usually comprise a plurality of flip-flop switches connected to an AND gate having at least one transistor for each inductance coil so that a negative pulse may be utilized to cause a first inductance coil to be de-energized and an adjacent inductance coil to be simultaneously energized in sequential fashion in order to effect an angular rotation of the motor's rotor shaft. To provide for a reverse angular rotation in the known systems, additional circuitry must be added, which necessarily further complexes and complicates the systems. Where stepper motors are to be utilized in expendable rocket propelled vehicles or like systems, cost, weight, size and complexity factors become critical, thus rendering the use of the known control systems undesirable as motor control systems.

Therefore, the purpose of this invention is to provide a simplified stepper motor control system utilizing a minimum number of circuit components to form a control system, which is capable of effecting a dual directional control for a rotor shaft.

An object of the present invention is to provide a simplified electronic pulse responsive control circuit for a stepper motor.

Another object is to provide an electronic pulse responsive control means capable of imparting reverse sequential rotation to a rotor shaft provided for a direct current stepper motor.

Still another object is to provide an economic control system having a minimum number of circuit components for electronically dictating direction and increment of rotation for a rotor shaft in a direct current motor.

Other objects, advantages, and novel features of the invention will become apparent from the following detailed description of the invention when considered in conjunction with the accompanying drawings wherein.

Figure 1:
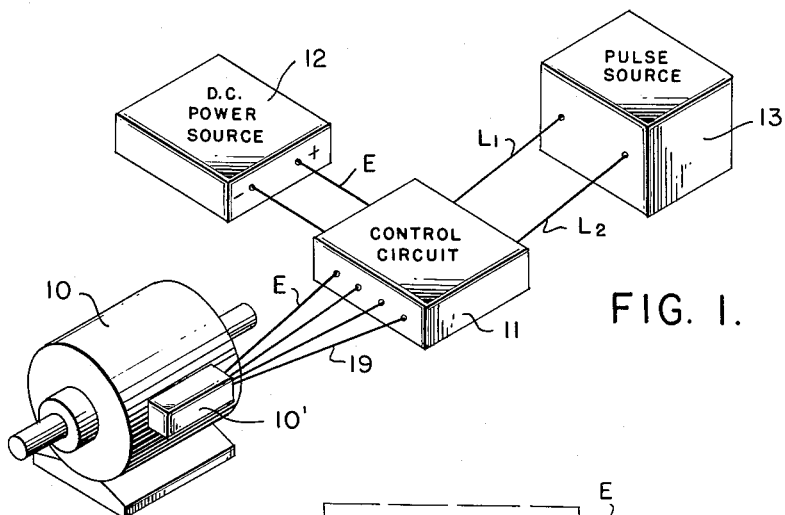
FIG. 1 is a diagrammatic view, in block form, depicting an environment for a stepper motor and the control system of the instant invention.

Referring now to the drawings, wherein like reference characters designate like or corresponding parts throughout the several views, there is shown in FIG. 1 a D.C. (direct current) stepper motor 10 and junction box 10', which may be mounted and connected within any desired environment including guidance systems for rocket propelled vehicles, not shown. A control unit 11 serves a major portion of the control system circuitry and is provided with the necessary terminals for connecting the unit 11 with a D.C. power source 12 and an electronic pulse source 13. The pulse source 13, which may include logic circuits, serves to provide a series of positive input signals through leads $L_1$ and $L_2$ to a pair of control circuit input channels. Since the specific pulse source 13 forms no part of the instant invention, a detailed description of the pulse source is omitted in the interest of brevity. It suffices to understand that the output from the pulse source 13 through leads $L_1$ and $L_2$ is in the form of a series of positive electronic pulses, which are intended to perform a control function for the stepper motor 10.

The D.C. power source may take the form of a battery pack or other suitable power supply means capable of providing a desired positive output voltage, for example, 24 volts, to the stepper motor control system.

Figure 2:
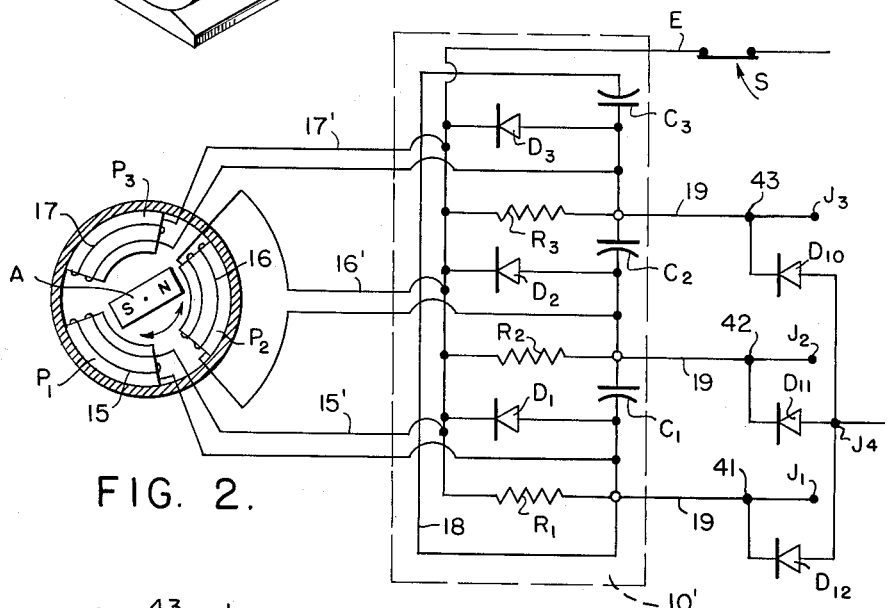
FIG. 2 is a partial schematic view illustrating a portion of stepper motor control circuitry, as provided for in the present invention.

Turning now to FIG. 2, the stepper motor 10 is provided with a plurality of field poles $P_1$, $P_2$ and $P_3$ and an armature or shaft-like rotor A. For the sake of simplicity the rotor A is shown in the drawings as comprising a permanent magnet rotor having opposite poles S and N. However, it is to be understood that any suitable design may be selected for the rotor A, provided that it is capable of being incrementally rotated in discrete "steps" by an incrementally rotated magnetic field.

Each of the poles $P_1$, $P_2$ and $P_3$ is provided with an inductance coil, designated 15, 16 and 17 with each coil having a pair of leads designated 15' 16' and 17', respectively. One side of each of the coils 15, 16 and 17 is connected in the junction box 10', through a first lead of each of the pairs 15', 16' and 17', to a positive power supply P of the source 12, FIG. 3, by a suitable connecting lead E. Within the connecting means E there is disposed a master control switch S, shown in closed position, which upon closing serves to cause the control system to become energized by establishing a circuit between the source 12 and the coils 15, 16 and 17. The opposite side of each of the coils 15, 16 and 17 is connected at junction points to a common connector 18 through a second lead of said pairs of leads 15', 16' and 17'.

The common connector 18 is provided with a plurality of current flow interrupting capacitor $C_1$, $C_2$ and $C_3$, which are arranged so as to be disposed between the junction points formed through connecting the coil leads with the common connector 18. The function of the capacitors $C_1$, $C_2$ and $C_3$ is to effect a current flow interruption for the current flowing through an adjacent coil to collapse a magnetic field established thereabout, as will hereinafter be more fully described.

Arranged adjacent to, and connected in parallel with each of the coils 15, 16 and 17 there is disposed a voltage dropping resistor, designated $R_1$, $R_2$ and $R_3$, which serves to divide the voltage load imposed across the coil when a current is caused to pass therethrough. Arranged adjacent to and connected in parallel with each of the inductance coils 15, 16 and 17, and also connected in parallel with a given one of the coil associated resistors, $R_1$, $R_2$ and $R_3$, there is provided a suitable diode, designated $D_1$, $D_2$ and $D_3$, which serves to permit a magnetic field generated by an adjacent coil to collapse when the current flow through the coil is interrupted.

Figure 3:
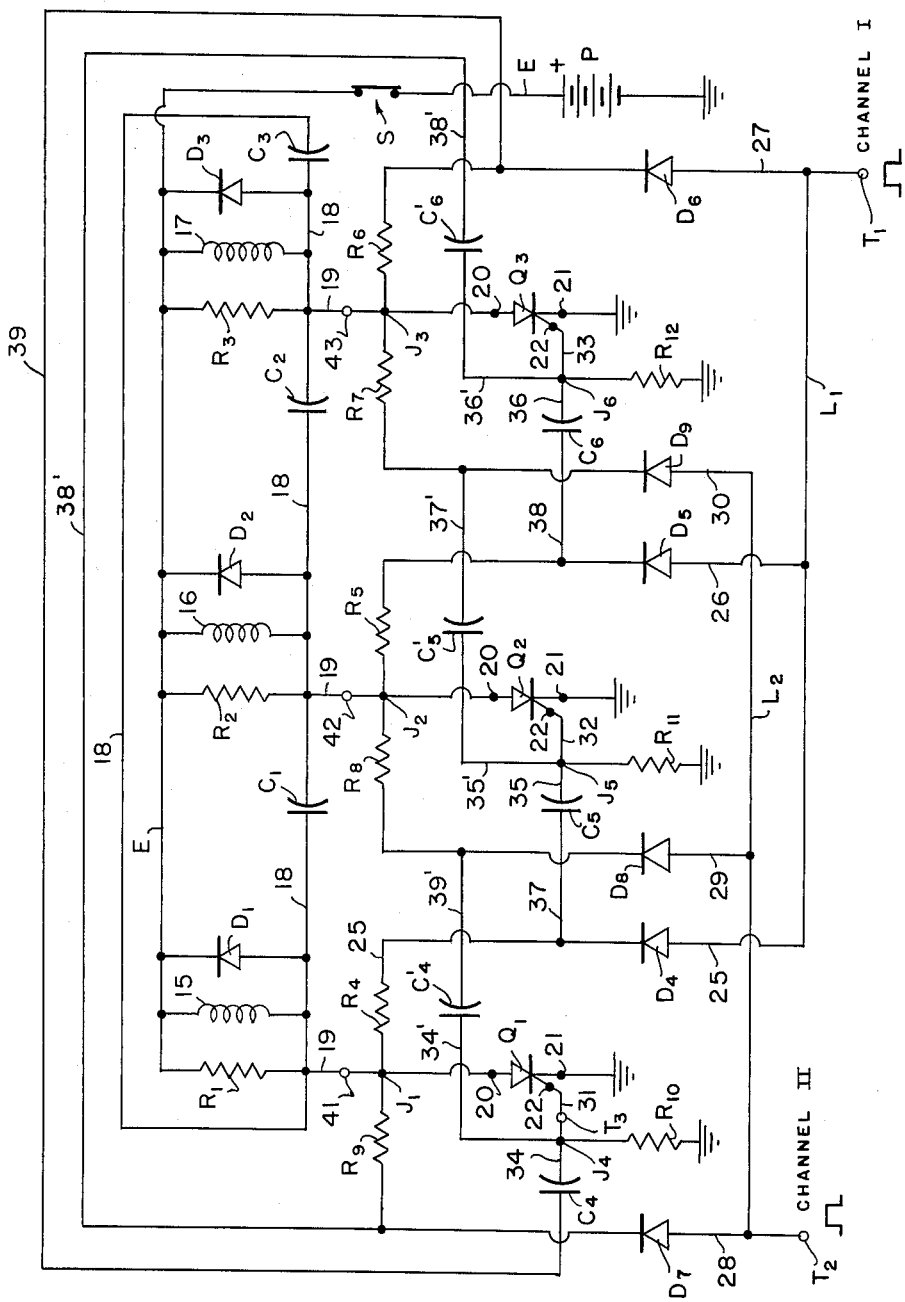
FIG. 3 is a composite schematic view of a major portion of the stepper motor control circuitry.

Referring now more particularly to FIG. 3, a plurality of leads 19 are provided between the common connector 18 for connecting a plurality of SCR (silicon controlled rectifier) diodes $Q_1$, $Q_2$ and $Q_3$ with the common connector. The SCR diodes are arranged so that the anode of any given SCR diode is singularly connected through a given one of the leads 19, and the connector 18, to a given one of the coils 15, 16, and 17 to provide an operable switch for completing an electrical circuit from the positive terminal of the D.C. power supply P, of the source 12, through the given coil to the negative terminal of the D.C. power supply, which for the sake of simplicity is shown as a ground terminal in FIG. 3.

The characteristics of SCR diodes are well known. However, it is to be understood that each of the SCR diodes, such as $Q_1$, for example, comprises a device having an anode 20, a cathode 21, and a gate 22. A positive voltage applied to the anode 20 of the device will block current flow through the device until a forward avalanche voltage value is reached in a manner similar to that which occurs in ordinary avalanche rectifiers. Upon reaching an avalanche voltage value the SCR diode goes into a state of high conduction resulting in a voltage drop across the device. In a thus established state of high conduction, current flow through the SCR diode is limited only by the external circuit impedance and the given supply voltage. At an anode to cathode voltage less than breakover voltage, the SCR diode can be switched into a state of high conduction by a small gate pulse applied from gate to cathode. This characteristic renders the SCR device highly desirable for use in the present invention, as it serves to control a relatively large amount of power from the power supply P, of the source 12, through the use of a low voltage pulsed signal obtained from the pulse source 13. When the SCR diode is in a state of conduction it remains conductive indefinitely, even after removal of the gate pulse, until the anode current is momentarily interrupted, or diverted for about 20 microseconds, after which the SCR diode will again assume a current blocking state.

Channels I and II, FIG. 3, serve to transmit the necessary gate pulses to each of the SCR diodes $Q_1$, $Q_2$, and $Q_3$, in the form of the hereinbefore mentioned positive output signal pulses, from the pulse source 13. The channels I and II comprise input terminals $T_1$ and $T_2$ for connecting the channels I and II with the pulse source 13. The leads $L_1$ and $L_2$, are separately connected with the terminals $T_1$ and $T_2$ and have connected therewith a plurality of pulse directing leads 25, 26, 27 and 28, 29, 30, respectively. Each of the pulse directing leads is provided with a current blocking diode, designated $D_4$, $D_5$, $D_6$, $D_7$, $D_8$, and $D_9$, and a voltage dropping resistor, designated $R_4$, $R_5$, $R_6$, $R_7$, $R_8$, and $R_9$. The pulse directing leads each terminate at a junction terminal $J_1$, $J_2$, and $J_3$ disposed along the SCR leads 19 and ahead of the anode of each of the SCR diodes $Q_1$, $Q_2$, and $Q_3$. It is to be particularly noted that each of the junction terminals $J_1$, $J_2$, and $J_3$ serve to connect two separate pulse directing leads to a single one of the SCR leads 19 in a manner such that each junction serves to accommodate input signals from both of the channels I and II. For example, note that the pulse directing lead 25 of channel I terminates at junction $J_1$, and the pulse directing lead 28 of channel II also terminates at the junction $J_1$. Therefore, it is possible to establish a closed circuit through a given one of the SCR diodes for an output pulse applied to either of the channel terminals $T_1$ and $T_2$ when the given diode is in a conductive state.

In order for pulsed input signals, as applied to either of the terminals $T_1$ and $T_2$, to be utilized as gate pulses for "turning on" the SCR diodes $Q_1$, $Q_2$, and $Q_3$, it is necessary to provide a plurality of gate connected gate leads 31, 32, and 33 to supply a pulsed signal to a connected gate. The gate leads 31, 32, and 33 terminate at terminal junctions $J_4$, $J_5$, and $J_6$, which are separately connected to ground, or the negative side of the power supply P, through resistors $R_{10}$, $R_{11}$, and $R_{12}$. These junctions serve as common terminals for the gate leads and a plurality of gate capacitor leads 34, 34', 35, 35', 36, and 36'. The gate capacitor leads serve to connect a gate capacitor, $C_4$, $C'_4$, $C_5$, $C'_5$, $C_6$, and $C'_6$, with the gate 22 at each of the SCR diodes $Q_1$, $Q_2$ and $Q_3$. Each of the gate capacitors $C_4$, $C'_4$, $C_5$, $C'_5$, $C_6$, and $C'_6$ is provided with a given connector, which serves to connect the capacitor with one of the pulse directing leads 25, 26, 27, 28, 29, and 30. For example, in order to connect the gate capacitor $C_5$ with the pulse directing lead 25, of channel I, a gate capacitor connector 37 is connected to the lead 25 between the diode $D_4$ and the voltage dropping resistor $R_4$, while a connector 37' is provided for the capacitor $C'_5$ and serves to connect the gate capacitor to the lead 30, of channel II, between the diode $D_4$ and the resistor $R_7$. In a similar manner gate capacitors $C_4$, $C'_4$ are connected with leads 27, 29, of channels I and II; through given connectors 39, 39', and gate capacitors $C_6$, $C'_6$ are connected with leads 26 and 28, of channels I and II, through given connectors 38 and 38'. Hence, it is to be understood that positive pulses applied at terminals $T_1$ and $T_2$ may be applied through the gate capacitors to the SCR diode gates to function as gate pulses for causing the SCR diodes $Q_1$, $Q_2$ and $Q_3$ to assume a conductive state.

Therefore, it is to be understood that when a given SCR diode, for example $Q_1$, is in a conductive state, a back bias of +24 volts, for example, is imposed on each side of the current blocking diodes, except the diodes $D_4$ and $D_7$. The back bias on each of the diodes $D_4$ and $D_7$ will depend on the anode voltage of $Q_1$, which would ordinarily be two volts when the SCR diode is in a conductive mode. Since a circuit may be completed from either terminal $T_1$ or $T_2$ through the conducting diode $Q_1$ to ground, or the negative side of P, a positive pulse may be applied to either of the capacitors $C_5$ or $C'_6$ depending upon which of the terminals, $T_1$ and $T_2$, receive a positive input pulse from the pulse source 13. Assuming, for purposes of explanation, that a positive pulse of a sufficient value necessary for "turning on" $Q_2$ is applied to the terminal $T_1$, the pulse will be directed through $L_1$, the diode $D_4$, and then be applied across the capacitor $C_5$ and also dropped across the voltage dropping resistor $R_4$. The capacitor $C_5$ becomes charged and imposes a positive gate pulse at the gate 22 of the SCR diode $Q_2$ for causing the SCR diode $Q_2$ to assume a conductive state. Since there is a +24 volts present at the anode 20 of the SCR diode $Q_2$, a current flow is established from the power supply P through the inductance coil 16, and the SCR diode $Q_2$ to ground. The current flow through the SCR diode $Q_2$, and its associated lead 19, causes the capacitor $C_1$ to discharge for thus causing the current to be momentarily diverted from the SCR diode $Q_1$ to thereby effect an interruption of current flow through $Q_1$, thus causing the diode $Q_1$ to be "turned off."

If it is now desired to again activate $Q_1$, a positive pulse may be applied to terminal $T_2$ for this purpose. The pulse is directed through the pulse directing lead 29 and applied at capacitor $C'_4$ for causing the capacitor $C'_4$ to become charged for thus imposing a positive charge on gate 22 of $Q_1$ so that a current flow may be again established through $Q_1$. The SCR diode $Q_1$ is thus "turned on" and the diode $Q_2$ "turned off" by interrupting or diverting the current flow from the SCR diode $Q_2$. However, if it is desired to "turn on" the SCR diode $Q_3$, when the SCR diode $Q_2$ is conducting a flow of current, a positive pulse applied to $T_1$ serves to "turn on" $Q_3$ and "turn off" $Q_2$ in a manner similar to that described with regard to SCR diodes $Q_1$ and $Q_2$.

It is to be particularly noted that the control circuit will not be effective unless one of the SCR diodes is in a conductive state. For example, when the switch S, FIG. 3, is closed no gate pulse can be applied at the gates 22 of the SCR diodes $Q_1$–$Q_3$, since none of the SCR diodes are in a conductive state, and the inductance of each of the inductance coils 15, 16, and 17 of the stator winding causes all of the silicon controlled rectifiers to remain "off." Therefore, means must be provided for initiating a flow of current through at least one of the SCR diodes $Q_1$, $Q_2$, and $Q_3$.

Figure 4:
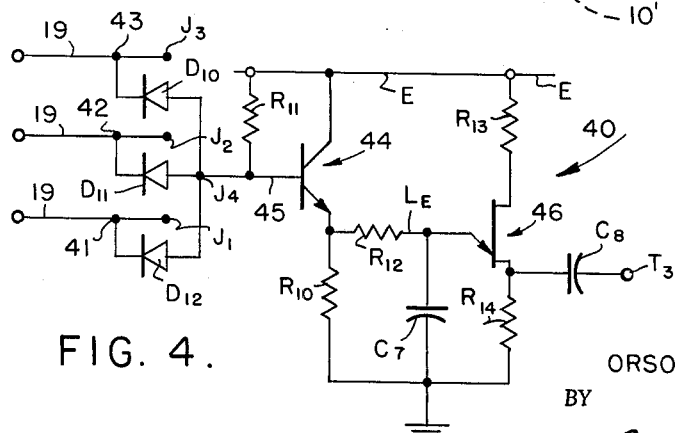
FIG. 4 is a schematic view of a control system monitoring AND circuit.

For initiating a current flow through one of the SCR diodes, a monitor or AND circuit 40, FIG. 4, is connected to the D.C. power supply P, of the source 12, through the means E, and is also connected at terminal $T_3$ to the gate 22 of the SCR diode $Q_1$, FIG. 3, in order to supply an input pulse to the gate lead 31 of the SCR diode $Q_1$. The monitor circuit 40 has arranged therein a plurality of diodes $D_{10}$, $D_{11}$, and $D_{12}$, each being separately connected with one of the SCR leads 19 at terminals 41, 42, and 43. The diodes $D_{10}$, $D_{11}$, and $D_{12}$ are provided at a common junction terminal $J_4$, FIG. 4, which is in turn connected with the base of an NPN transistor 44 by means of a connecting lead 45. The transistor 44, in turn, is connected between the positive terminal of the D.C. power supply P and ground so that its emitter is connected to ground through a given resistor $R_{10}$. A base biasing resistor $R_{11}$ is provided between the power supply P and the NPN transistor base through the connecting lead 45. The emitter of the transistor 44 is connected, by a lead $L_E$, through a resistor $R_{12}$ to the base of a unijunction transistor 46, which, in turn, is connected to the power supply P through a resistor $R_{13}$, and to ground through a resistor $R_{14}$. A capacitor $C_7$ is connected to lead $L_E$ between the base of the unijunction transistor 46 and ground, and a capacitor $C_8$ serves to couple the AND circuit 40 with the terminal $T_3$ so that when the monitor or AND circuit 40 provides a positive output signal from the unijunction transistor 46, a gate pulse is directed to the gate 22 of the SCR diode $Q_1$ to thus "turn on" the diode and establish a closed circuit through the inductance coil, or stator winding 15, FIG. 3, as hereinbefore described. Therefore, when one of the SCR diodes $Q_1$, $Q_2$, and $Q_3$ is in a conductive mode, the AND or monitoring circuit 40 will remain "off," due to the closed circuit established through one of the leads 19, at a given terminal 41–43, and the conducting SCR diode, but when no current flows through any of the SCR diodes, the transistor 44 may be "turned on," due to a positive charging of its base through the biasing resistor $R_{11}$, thus causing a positive pulse output from the NPN transistor 44 to be applied to the base of the unijunction transistor 46, for thereby causing an AND circuit output to be imposed as a gate signal pulse on the gate 22 of the SCR diode $Q_1$. The SCR diode $Q_1$ now becomes conductive and input signals from the pulse source 13 may be utilized in the hereinbefore described manner.

Operation of the system may be summarized as follows: Assuming the switch S to be open so that no current is flowing through the stator windings, or inductance coils 15, 16, and 17, no rotation may be imparted to the rotor A of the stepper motor 10, due to an absence of a magnetic field. However, when the switch S is closed, a voltage determined by the output value of P is imposed on each of the coils at its positive or power source side, and, simultaneously therewith, a positive voltage is imposed on the base of the NPN transistor 44 of the AND circuit 40. Since the SCR diodes $Q_1$, $Q_2$, and $Q_3$ are in a non-conductive mode, the closing of switch S fails to establish a current flow through the inductance coils 15, 16, and 17. As no current is flowing through the SCR diodes, the monitor or AND circuit 40 provides a gate signal pulse at the gate 22 of the SCR diode $Q_1$, thereby causing the diode $Q_1$ to be "turned on," or to assume a conducting state. The monitor or AND circuit 40 is now "turned off" since a circuit is closed to ground through the terminal 41 and SCR diode $Q_1$.

With the SCR diode $Q_1$ assuming a conductive state, the inductance coil 15 becomes energized and establishes a magnetic field to cause the armature A, FIG. 2, to be rotated to a starting position. Assuming now that a positive pulse is introduced at the terminal $T_1$, FIG. 3, the positive pulse acts through the capacitor $C_5$, FIG. 3, to cause a gate signal pulse to be imposed on the gate 22 of the SCR diode $Q_2$ for establishing a current flow from the D.C. power supply P, of source 12, through the connecting means E, the inductance coil 16, and the SCR diode $Q_2$ to ground, the negative terminal of the power source P. The thus established current flow causes the capacitor $C_1$ to discharge effectively interrupting the current flow through the SCR diode $Q_1$ to cause SCR diode $Q_1$ to be "turned off." The magnetic field of the inductance coil 15 now collapses, through the diode $D_1$, and the armature is rotated to a second position under the influence of a magnetic field established by the current flow in the inductance coil 16. The armature may now be rotated in like manner from the second position to a third position by the introduction of another positive pulse at $T_1$, or, if desired, a positive pulse introduced at the $T_2$ serves for rotating the armature A back to the armature starting position under the influence of a magnetic field re-established by a current flow through coil 15.

Therefore, it is to be understood that the control system, or circuit, of the present invention provides a simple and economic stepper motor control means which accommodates a stepped rotation of a D.C. motor's armature shaft, or rotor, in opposite directions under the influence of a rotating magnetic field, the direction and increments of which are dictated by a stream of electronic pulses from a positive pulse source, or logic circuit. Furthermore, since the values for the various circuits may be varied to obtain similar results for different operating conditions, and since the values may be readily determined in a conventional manner, specific designations thereof have been eliminated in the interests of brevity.

Obviously many modifications and variations of the present invention are possible in the light of the above teachings. It is therefore to be understood that within the scope of the appended claims the invention may be practiced otherwise than as specifically described.

What is claimed is:

1. A control system for a direct current motor having a driven rotor and a plurality of rotor driving magnetic field establishing inductance coils, comprising in combination:

a direct current voltage source having a positive and a negative terminal for imposing a direct current voltage across each of the coils of said motor;

a plurality of silicon controlled rectifiers so disposed as to provide a single silicon controlled rectifier between each of said coils and the negative terminal of said source;

a positive voltage signal pulse source;

means for connecting the positive voltage signal pulse source with the gate of each of said silicon controlled rectifiers;

a plurality of gate capacitors arranged within the signal pulse source connecting means so as to provide a single gate capacitor disposed between the gate of each of the silicon controlled rectifiers and the signal pulse source; and a plurality of current interrupting capacitors singularly connected between the coils, at the negative terminal sides thereof, so as to provide a single silicon controlled rectifier interrupting capacitor between each of the coils, whereby when a given first silicon controlled rectifier of said plurality of silicon controlled rectifiers is conducting a current, and a first coil of said plurality of coils is energized, a positive pulse applied to the pulse source connecting means serves to activate a second silicon controlled rectifier to thus sequentially energize a second coil adjacent said first coil and effect an interruption of current through said first silicon controlled rectifier to impart a rotation to said rotor of said motor through a thus sequentially established rotating magnetic field.

2. The control system of claim 1 wherein an "AND" circuit having input terminals connected with each of the anodes of said silicon controlled rectifier diodes monitors the conductivity of each of the silicon controlled rectifier diodes and serves to provide a negative charge at the gate of said first silicon controlled rectifier to cause said rectifier to become conductive when a state of non-conductivity is imposed on all of the silicon controlled rectifiers of the control system.

3. The system of claim 1, further comprising:
a plurality of current blocking diodes so arranged within said signal pulse source connecting means as to dispose a single one of said diodes between each gate capacitor and said signal pulse source, whereby a signal pulse from said source may be directed to said gate capacitor while being back-biased by said direct current voltage source.

References Cited by the Examiner
UNITED STATES PATENTS

| | | | |
|---|---|---|---|
| 2,980,839 | 4/1961 | Haussermann | 318—138 |
| 3,023,348 | 2/1962 | Cox | 318—138 |
| 3,025,443 | 3/1962 | Wilkinson et al. | 318—138 |

ORIS L. RADER, *Primary Examiner.*

S. GORDON, *Assistant Examiner.*